United States Patent [19]

Yun et al.

[11] Patent Number: 5,057,934
[45] Date of Patent: Oct. 15, 1991

[54] CIRCUT FOR TAPE DUPLICATION IN VIEO TAPE RECORDER

[75] Inventors: Jong-Kyung Yun; Oh-Kwang Kwon, both of Suwon-city, Rep. of Korea

[73] Assignee: SamSung Electronics Co., Ltd., Suwon, Rep. of Korea

[21] Appl. No.: 375,472

[22] Filed: Jul. 5, 1989

[30] Foreign Application Priority Data

Apr. 7, 1988 [KR] Rep. of Korea ................. 885067[U]

[51] Int. Cl.$^5$ ............................................ H04N 5/782
[52] U.S. Cl. .................................. 1358/335; 358/314; 358/330; 358/327; 360/15; 360/38.1
[58] Field of Search ............... 358/310, 330, 335, 327, 358/23, 37, 314; 360/15, 33.1, 38.1

[56] References Cited

U.S. PATENT DOCUMENTS 4,510,530 4/1985 Miura et al. .................... 358/327 X
4,906,942 3/1990 Nakai et al. .................... 358/327 X Primary Examiner—Robert L. Richardson Attorney, Agent, or Firm—Robert E. Bushnell

[57] ABSTRACT

The invention provides a FM signal transfer-recording system of VTR including; a RF output signal through the low pass filter of the reproduction set is applied to the pre-amp through the high frequency compensation part of the record set, and a synchronization signal separated at the synchronization-separating part of the reproduction set generates a switching pulse of 30 Hz through 1 switch, horizontal synchronization-separating part and monostable multivibrator of the record set in order to synchronize control pulse part and the drum servo. Recording directly the reproduced RF signal without FM demodulation and modulation and applying the synchronization signal of the reproduction set to the record set so as to synchronize control pulse and the drum servo with the synchronization signal of the reproduction set may be possible and removing the screen blazing generated due to FM demodulation and modulation may be attained according to the present invention.

21 Claims, 1 Drawing Sheet

CIRCUIT FOR TAPE DUPLICATION IN VIDEO TAPE RECORDER

BACKGROUND OF THE INVENTION

The present invention relates to a circuit for tape duplication in video tape recorder, particularly to a system which can reduce picture degradation occurring in the case of tape duplication, by recording directly the read signal from a tape on another tape without FM modulation or demodulation.

Generally, if the image signal recorded on a tape is picked-up at a head, and the amplified and FM modulated signal becomes a luminance signal through FM demodulation, and after the color signal of low band(625 KHz+500 KHz) is demodulated, and the luminance signal and color signal are summed to be a composite image signal as a reproduction method of VTR, then after this composite image signal is received, the luminance signal and the color signal are separated from the composite image signal, and the separated signals are recorded again on a tape through FM modulation and the low frequency modulation for the color signal, as a recording method for a VTR, but in the conventional case when duplicating the VTR tape, the duplication can be achieved through reproduction and recording steps so that picture degradation is caused.

That is, in case of the duplicate of a VTR tape, the FM modulated signal and the low band modulated color signal are recorded through the FM demodulation and modulation, so that the picture quality can be subjected to greater deterioration since picture degradation is caused as the duplicating operation is repeated.

SUMMARY OF THE INVENTION

The present invention has been made in consideration of this and has for one of its objects to provide a circuit for tape duplication in video tape recorder in which the duplication operation can be carried out by transmitting directly a RF signal from low pass filter to the record set and synchronizing the switching pulse of the record set with the synchronizing signal of the reproduction set, without the FM modulation and demodulation, and the picture degradation can be prevented at the same time.

The object of the present invention can be achieved through the following operations: the amplified FM carrier signal at the pre-amp. of the reproduction set is compensated by the drop-out compensation, and it is signal-processed through the reproduction loop including a limiter and a FM modulator, on the other hand, the FM carrier signal is directly applied to the pre-amp. of the record set and is recorded, and the FM demodulated signal is applied to the record set after the separation of synchronization, and the switching pulse of 30 Hz is made up by separating the vertical synchronizing signal, and it is synchronized with the synchronization signal of the reproduction set so that the duplicate of a tape can be directly carried out without FM modulation and demodulation processing.

According to the present invention, there is provided a circuit for tape duplication in video tape recorder in which a RF output signal through the low-pass filter of the reproduction set is applied to the pre-amp through the high frequency correction part of the record set, and a separated synchronizing signal at the synchronization signal separation part(in short synchronizing separation part) of the reproduction set generates the switching pulse of 30 Hz through the switch, the vertical synchronizing separation part and a monostable multivibrator of the record set so that the control pulse part and the drum servo can be synchronized.

DETAILED DESCRIPTION OF THE INVENTION

Figure 1:
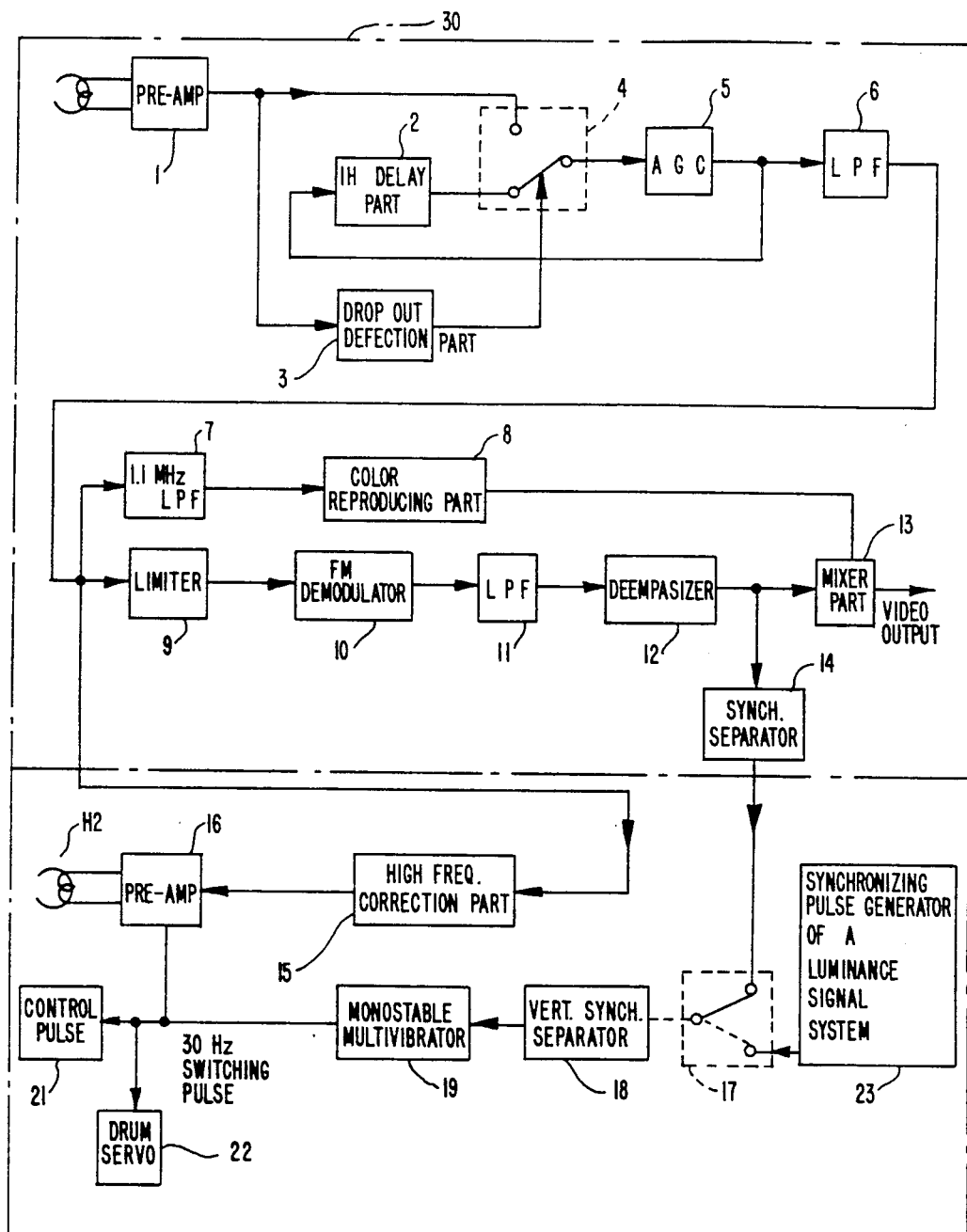
FIG. 1 is a circuit diagram of the present invention.

The present invention will now be described in more detail with reference to the accompanying figure.

The present invention is composed of two major parts: the reproduction set 30 for reproducing the signal on a tape, and the record set 40 for recording the output signal of the reproduction set 30. The reproduction set 30 and the record set 40 can be composed of either two different VTR's or only one VTR of double deck type.

First, the reproduction set 30 is identical with the conventional reproduction signal-processing block, where the signal picked up at a head H1 is amplified through a pre-amp 1 and is applied to AGC(automatic gain controller) 5 through a switch 4, but if a drop-out occurs at some part, the drop-out detecting part 3 connects the switch 4 as shown in the figure, so that the 1H delayed signal through 1H delay part 2 is applied to AGC 5, and after the output of AGC 5 passes a low pass filter 6, it also passes a low pass filter 7 of cut-off frequency 1.1 MHz so that the color signal is transferred to the mixer 13, from the color reproduction part 8, and at the same time, after the output of the low pass filter 6 is limited through the limiter 9, thereby becoming a suitable level for demodulation, and the limited signal is applied to the synchronizing separation part 14 and a mixer 13 through the FM demodulator 10, a low pass filter 11, and a deemphasizer 12, and the luminance signal and the color signal are summed up at the mixer 13, thereby producing the video signal, and the synchronizing signal is separated at the synchronizing separation part 14.

And the RF output signal (FM signal plus low band modulated color signal) of the low pass filter 6 in reproduction set 30 is corrected through the high frequency correction part 15 of the record set 40, and it is recorded at the head H2 through a pre-amp 16, the synchronizing signal of the synchronizing separation part 14 generates the switching pulse of 30 Hz through a switch 17, a vertical synchronizing separation part 18, and monostable multivibrator 19, so that the control pulse 21, the drum servo 22, and a pre-amp-16 are controlled by the switching pulse.

At this time, in case of a normal VTR operation, the synchronization signal from a synchronizing signal generator of luminance signal system 2 is selected to be used by the switch 17, but in case of the duplicate of a tape, the synchronizing signal of the synchronizing signal separating part 14 is used by a selection of the switch 17.

The present invention like this can use either two different VTR's or only a VTR of double-deck type, and the VTR tape can be duplicated without the picture degradation.

To explain in detail, first, the pre-amp 1 amplifies the FM modulated luminance signal and the low-band modulated color signal picked up at the head H1 and this RF signal(FM modulated signal plus low-band modulated signal) is directly applied to AGC 5 through the switch 4 when the RF signal is normal, but if the drop-out occurs in the RF signal, the 1H delayed RF signal by the 1H delay part 2 is applied to AGC 5.

At this time, the drop-out detector 3 transmits the only FM main carrier frequency component of RF signal level, and if the level is low, then it is regarded as a drop-out, and the switch is connected as shown in the figure thereby applying the 1H delayed signal by the 1H delay part 2 the AGC 5.

And, the low pass filter 6 is controlled to transmit the only necessary component of the output of the low pass filter 1, and the RF signal through the low pass filter 6 is applied to the low pass filter 7 of cut-off frequency 1.1 MHz so that the only low-band modulated color signal(629 KHz ±500 KHz) can be transmitted, and this color signal is applied to a mixer 13 through the color signal reproduction part 8.

Also, the output of the low pass filter 6 is applied to a limiter 9 so that it is limited to a suitable level for the FM demodulation, and the luminance signal is applied to a mixer 13 and the synchronizing separation part 14 through the FM demodulator 10, the low pass filter 11, and the deemphasizer 12.

Thus, the luminance signal and the color signal are summed at the mixer 13 so that the video signal is generated transmitting the recorded contents on monitor for seeing and hearing, and the synchronizing separation part 14 separates the synchronization signal.

The reproduction set which performs such operations is identical with the conventional VTR.

In case of the present invention, the RF output signal of the low pass filter 6 and the separated synchronization signal at the synchronizing separation part 14 are directly connected to the record set 40. That is, the high frequency correction part 15 of the record set 40 receives the RF signal transmitted from the low pass filter 6 and records it at the head H2 through the pre-amp 16 after determining the blazed high frequency components, and the synchronizing signal separated at the synchronizing separation part 14 of the reproduction set 30 generates the switching pulse of 30 Hz through the switch 17, the vertical synchronizing separation part 18, and monostable multivibrator 19.

The switching pulse of 30 Hz can be recorded on the control track of a tape through the control pulse part 21, and it is applied to the drum servo 22, thereby controlling the servo of the drum speed, and also applied to the pre-amp 16 for channel switching of the recorded signal.

At this time, the switch 17 is converted for applying the synchronizing signal separated at the synchronizing separation part 14 to the vertical synchronizing separation part 18 in case of the duplication of a tape, and the switch is converted to a normal position in the case of conventional operation of the VTR so that the synchronizing signal 23 of the luminance signal system can be applied to the vertical synchronizing separation part 18.

As mentioned above, the first set of the present invention reproduces the program to be copied, and the second set records it, so that the present invention can be composed of a double deck, and the state of the reproduced signal in the reproduction set 30 can be conformed on monitor.

This reproduced RF signal is applied to the record set 40 after the drop-out compensation, and the synchronizing signal separated at the synchronizing separation part 14 is also applied to the record set 40.

Thus, after the record set 40 corrects the RF signal applied from the reproduction set 30 through the high frequency correction part 15, the record set 40 records it at the head 2 through the pre-amp 16, also after the synchronizing signal separated at the synchronizing separation part 14 of the reproduction set 30 separates again the vertical synchronization signal through the vertical synchronizing separation part 18, and it generates the switching pulse of 30 Hz through the monostable multivibrator, and the switching signal of 30 Hz can be recorded on the control track of a tape, also it is applied to pre-amp 16 for the channel switching of the recorded signal.

As mentioned above, the present invention can remove the picture degradation generated due to the FM demodulation and modulation by recording directly the reproduced RF signal without FM demodulation and modulation and applying the synchronizing signal of the reproduction set to the record set so that the control pulse and the drum servo can be synchronized with the synchronization signal of the reproduction set.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A circuit for tape duplication in a video tape receiver, comprising:
   a reproduction set comprising:
      a low pass filter for filtering a radio frequency signal; and
      synchronizing signal separating means for separating a synchronizing signal, from the radio frequency signal filtered by said low pass filter, to generate a first signal; and
   a record set comprising:
      a pre-amp for receiving the radio frequency signal from said low pass filter through a high frequency compensation circuit; and
      a switch for receiving the first signal from said synchronization-separating part and passing the first signal through a vertical synchronizing signal separating means and a monostable multivibrator to generate a switching pulse for synchronizing a control pulse means and a drum servo.

2. A circuit for tape duplication for a video tape recorder from one tape to another tape without demodulation frequency modulation signal, comprising:
   a video tape reproduction component including means for passing a low pass radio frequency output signal having a frequency modulated signal and a low band signal and means for separating a first synchronization signal from said radio frequency output signal; and
   a video tape recording component including means for separating a synchronization signal from said first synchronization signal, means for generating a switching pulse signal from said vertical synchronization signal, and means for applying said switching pulse signal to control operation of a tape drum within said recording component.

3. A method for reducing picture degradation during copying in a video tape recorder, comprising the steps of:

amplifying a first signal detected at a first video head in a first amplifying step;
controlling the gain of said first signal;
filtering said first signal in a first filtering step;
limiting said first signal, after said first filtering step to a first level for demodulation to produce a second signal;
performing a second filtering operation on said first signal, after said first filtering step, to produce a third signal;
demodulating the second signal and filtering the demodulated second signal;
mixing said filtered demodulated second signal and said third signal for producing a fourth video signal;
amplifying said first signal, after said first filtering step, prior to recording by a second video head in a second amplifying step;
recording the amplified first signal;
separating a synchronizing signal from said filtered demodulated second signal;
producing a switching pulse from said separated synchronizing signal; and
applying said switching pulse to said amplifying stage to allow channel switching of the amplified first signal.

4. A method as claimed in claim 3, further comprising the step of controlling the gain of a delayed signal combined with the first signal, when a low level of a main carrier frequency of the first signal is detected, to compensate for the low level.

5. A method as claimed in claim 4, wherein the delayed signal is a delay of the gain controlled first signal.

6. A method as claimed in claim 5, wherein said synchronizing signal is not applied to produce said switching pulse when the video tape recorder is not in a recording mode.

7. A frequency modulation signal transfer recording system of a video tape recorder, comprising:
reproduction means for directly transmitting both an image signal received from a recorded signal reproduced by a head of the video tape recorder and a synchronizing signal; and
recording means for receiving said image signal and said synchronizing signal, converting the synchronizing signal to a switching pulse generated in said recording means and applying the switching pulse to the transmitted image signal to eliminate picture degradation.

8. A system of a video tape recorder as claimed in claim 7, wherein said reproduction set comprises:
first filter means for limiting the frequency of the image signal; and
sync separating means for separating a synchronous signal, from the image signal limited by said first filter means.

9. A system of a video tape recorder as claimed in claim 8, wherein detection means determines if the image signal is below a predetermined level before enabling application of said image signal to said first filter means.

10. A system of a video tape recorder as claimed in claim 9, further comprising means for controlling gain of the image signal before limiting in said first filter means.

11. A system of a video tape recorder as claimed in claim 10, further comprising delay means for compensating the image signal, through a feedback loop to apply a delayed image signal to the means for controlling gain, when the image signal is determined to be below the predetermined level by said drop-out detection means.

12. A system of a video tape recorder as claimed in claim 11, further comprising a limiter and demodulator coupled to receive the limited image signal for generating a brightness signal before separating the synchronous signal.

13. A system of a video tape recorder as claimed in claim 11, further comprising:
second filter means to further limit the limited image signal to produce a color signal; and
means for mixing the color signal with the brightness signal to produce a video output.

14. A system of a video tape recorder as claimed in claim 8, wherein said recording means comprises:
high frequency compensation means for correcting the limited image signal, from said first filter means, before recording the corrected image signal through a pre-amplifier;
means for generating a switching pulse, from said synchronous signal, for channel switching of the corrected image signal and eliminating picture degradation when recording; and
means for coupling said synchronous signal to said means for generating based on a mode of operation of the video tape recorder.

15. A system of a video tape recorder as claimed in claim 14, further comprised of means for controlling the speed of a tape drum on the basis of said switching pulse.

16. A frequency modulation signal transfer recording system of a video tape recorder, comprising:
a high frequency compensation means for correcting a received radio frequency signal for recording by a head through a pre-amplifier means; and
switching pulse means for synchronously generating, from a received synchronizing signal, a switching pulse and applying said switching pulse to said pre-amplifier means, when the video tape recorder is in a record mode, to eliminate picture degradation.

17. A system of a video tape recorder as claimed in claim 16, further comprised of a drum servo for channel switching of a recorded signal, wherein the speed of said drum servo is controlled by said switching pulse.

18. A system of a video tape recorder as claimed in claim 16, further comprised of:
switch means; and
a brightness signal system coupled to transmit a brightness signal to said switching pulse means through said switch means when the video tape recorder is not in a record mode.

19. A system of a video tape recorder as claimed in claim 16, further comprised of a reproducing means coupled to said system for transmitting said radio frequency signal and said synchronizing synchronizing signal to said system.

20. A system of a video tape recorder as claimed in claim 18, wherein said switching pulse means is further comprised of:
vertical synchronization separating means, coupled to receive the synchronizing signal or brightness signal, for separating a vertical synchronization signal therefrom; and monostable multivibrator means, coupled to receive the vertical synchronization signal, for generating the switching pulse.

21. A frequency modulation signal transfer-recording system of a video tape recorder, comprising:
 a reproduction means for reproducing a program to be copied, comprising:
  first pre-amp means for amplifying a first signal received from a head on the video tape recorder;
  drop out detection means for determining if the first signal, amplified by said first pre-amp means, is below a certain level;
  delay means for compensating the first signal upon detection, by said drop out detection means, of the first signal being below said certain level;
  first switch means for connecting said first pre-amp means or said delay means to an automatic gain controller, based on the detection of a low signal;
  said automatic gain controller controlling the gain of the first signal or the compensated first signal to produce a gain controlled first signal;
  first filter means for filtering the gain controlled first signal for producing a filtered first signal;
  second filter means for separating a color signal contained in the first signal from the filtered first signal;
  limiter means for limiting the filtered first signal to a level suitable to demodulation;
  demodulator means for demodulating the limited first signal for producing a demodulated signal;
  a mixer for mixing the color signal separated from the first signal and the demodulated signal, producing a video signal; and
  a synchronization separating means for generating a synchronization signal from the demodulated signal; and
 a recording means for recording the reproduced program to be copied, comprising:
  a high frequency compensation means for correcting the filtered first signal, from said first filter means, for
  recording through a second pre-amp means;
  second switch means for connecting said synchronization signal to a switching pulse means based on a mode of operation of the video tape recorder; and
  said switching pulse means generating a switching pulse used in channel switching during recording.

* * * * *

UNITED STATES PATENT AND TRADEMARK OFFICE
CERTIFICATE OF CORRECTION

PATENT NO. :   5,057,934

DATED      :   15 October 1991

INVENTOR(S) :  Jong-Kyung YUN et al.

It is certified that error appears in the above-identified patent and that said Letters Patent is hereby corrected as shown below:

ON THE TITLE PAGE, ITEM [54]:

change "CIRCUT FOR TAPE DUPLICATION IN VIEO TAPE RECORDER" to --CIRCUIT FOR TAPE DUPLICATION IN VIDEO TAPE RECORDER--;

Column 1,   Line 28,  change "duplicate" to --duplication--;

Line 40,  delete "record";

Line 41,  change "set" to --high-frequency correction part--;

Line 58,  change "duplicate" to --duplication--;

Column 2,   Line 55,  change "2" to --23--;

Line 56,  change "duplicate" to --duplication--;

Line 58,  change "separating" to --separation--;

Claim 16,   Column 6,  Line 36,  delete "a";

Claim 19,   Column 6,  Line 60,  delete "synchronizing" (second occurrence);

UNITED STATES PATENT AND TRADEMARK OFFICE
CERTIFICATE OF CORRECTION

PATENT NO. : 5,057,934

DATED : 15 October 1991

INVENTOR(S) : Jong-Kyung YUN et al.

It is certified that error appears in the above-identified patent and that said Letters Patent is hereby corrected as shown below:

Claim 21,   Column 7,   Line 7,   delete "a" (first occurrence);

Column 8,   Line 11,  delete "a";

Line 14,  delete "a";

Line 16,  delete "a".

Signed and Sealed this

Sixteenth Day of March, 1993

*Attest:*

STEPHEN G. KUNIN

*Attesting Officer*        *Acting Commissioner of Patents and Trademarks*